United States Patent [19]

Adkins et al.

[11] Patent Number: 5,247,671
[45] Date of Patent: Sep. 21, 1993

[54] SCALABLE SCHEDULES FOR SERIAL COMMUNICATIONS CONTROLLER IN DATA PROCESSING SYSTEMS

[75] Inventors: John T. Adkins, San Antonio; James S. Pogorzelski, Georgetown; Jacqueline H. Wilson, Austin, all of Tex.

[73] Assignee: International Business Machines Corporation, Armonk, N.Y.

[21] Appl. No.: 479,777

[22] Filed: Feb. 14, 1990

[51] Int. Cl.⁵ .......................... G06F 9/46; G06F 13/00
[52] U.S. Cl. ............................... 395/650; 364/DIG. 1; 364/230.3; 364/281.3; 364/281.8; 364/342.9; 364/241.5; 395/725
[58] Field of Search .................. 395/650, 325, 725

[56] References Cited

U.S. PATENT DOCUMENTS

| | | | |
|---|---|---|---|
| 3,587,054 | 6/1971 | Byrne et al. | 364/900 |
| 3,599,162 | 8/1971 | Byrne et al. | 364/200 |
| 4,257,095 | 3/1981 | Nadir. | |
| 4,261,033 | 4/1981 | Lemay et al. | 364/200 |
| 4,479,211 | 10/1984 | Bass et al. . | |
| 4,493,036 | 1/1985 | Boudreau et al. . | |
| 4,494,194 | 1/1985 | Harris et al. | 364/200 |
| 4,560,985 | 12/1985 | Strecker et al. . | |
| 4,636,944 | 1/1987 | Hodge . | |
| 4,642,756 | 2/1987 | Sherrod . | |
| 4,719,569 | 1/1988 | Ludemann et al. . | |
| 4,739,323 | 4/1988 | Miesterfeld et al. . | |
| 4,747,130 | 5/1988 | Ho . | |
| 4,751,634 | 6/1988 | Burrus, Jr. et al. | 364/200 |
| 4,803,623 | 2/1989 | Klashka et al. | 364/200 |
| 4,814,974 | 3/1989 | Narayanan et al. . | |
| 4,821,177 | 4/1989 | Koegel et al. . | |
| 4,870,566 | 9/1989 | Cooper et al. | 364/200 |
| 4,980,820 | 12/1990 | Youngblood | 364/200 |

OTHER PUBLICATIONS

"Asynchronous Task Scheduler", *IBM Technical Disclosure Bulletin*, vol. 14, No. 10, Mar., 1972, pp. 3192–3193.

"Checking Random-Access Memory", *IBM Technical Disclosure Bulletin*, vol. 20, No. 10, Mar., 1978, pp. 4173–4174.

"Memory/Register Addressability Verification", *IBM Technical Disclosure Bulletin*, vol. 25, NO. 6, Nov., 1982, pp. 3094–3095.

"Algorithm For Fast Address Testing Of Memory Components And Memory Boards", *IBM Technical Disclosure Bulletin*, vol. 29, No. 11, Apr., 1987, pp. 4917–4920.

*Primary Examiner*—Eddie P. Chan
*Attorney, Agent, or Firm*—Andrew J. Dillon; Kenneth C. Hill

[57] ABSTRACT

A serial communications adapter provides an interface to physical communications ports. A scheduler executing on the adapter schedules tasks at different priority levels, so that time-critical tasks are performed quickly enough to prevent data loss. Data to be transmitted or received through a communications port is stored in buffers on the adapter, and data and command communications between the adapter and the host system are preferably performed over a DMA channel.

9 Claims, 7 Drawing Sheets

SCALABLE SCHEDULES FOR SERIAL COMMUNICATIONS CONTROLLER IN DATA PROCESSING SYSTEMS

BACKGROUND OF THE INVENTION

1. Field of the Invention.

The present invention relates generally to digital computer systems, and more specifically to subsystems for interfacing host computer systems with serial communication lines.

2. Description of the Prior Art.

Communications between computers are extremely important to modern computer systems. Some computers have several independent serial communications ports which operate simultaneously. Controlling simultaneous communications sessions on several ports can place demands on a system processor which degrade overall system performance.

One solution to this performance problem is to use "smart" communications adapters. These adapters handle all of the low level details of a communications session. The adapters communicate with their host system to transfer data in relatively large blocks. Both received data and data to be transmitted are transferred between the adapter and the host system using block transfers. Direct memory access (DMA) can be used for such transfers to further reduce the processing burden placed on the host central processor.

In order to provide multiple communications ports in a system having a limited number of adapters, several ports can be placed on a single adapter. However, this approach can lead to significant problems. Data and command handling for several independent ports can become quite complex, especially at high communications rates. When different speeds and protocols are used on the different communications ports, the problem becomes greatly exacerbated. It becomes difficult for the adapter to insure that all communications ports are handled in a timely manner.

It would be desirable to provide a system suitable for use as a communications port adapter which can handled multiple independent ports without loss of data.

SUMMARY OF THE INVENTION

It is therefore an object of the present invention to provide a system suitable for use as a communications port adapter in a host computer system.

It is another object of the present invention to provide such a system wherein multiple communications ports are supported on a single adapter, and wherein each port operates independently of the others.

It is a further object of the present invention to provide such a system wherein the communications ports are handled in such a manner as to insure that no data is lost on any port.

Therefore, according to the present invention, a serial communications adapter provides an interface to physical communications ports. A scheduler executing on the adapter schedules tasks at different priority levels, so that time-critical tasks are performed quickly enough to prevent data loss. Data to be transmitted or received through a communications port is stored in buffers on the adapter, and data and command communications between the adapter and the host system are preferably performed over a DMA channel.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 4 comprising 4a, 4b and 4c is a set of flow charts illustrating execution of tasks and interrupts on a preferred adapter system;

DESCRIPTION OF THE PREFERRED EMBODIMENT

Figure 1:
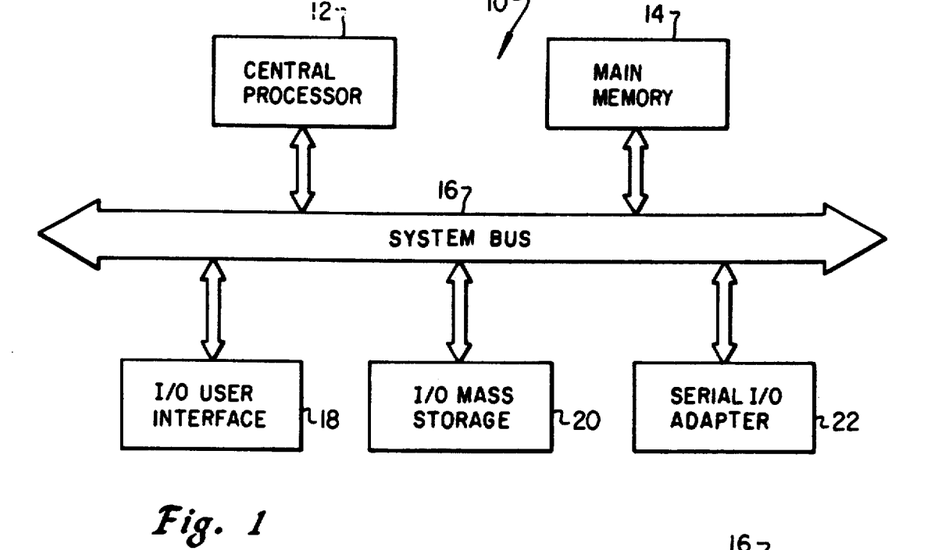
FIG. 1 is a block diagram of a host computer system.

Referring to FIG. 1, a computer system, referred to generally as a host system, is indicated by reference number 10. The system 10 includes a central processor 12 and a main memory 14 connected to a system bus 16. One or more user interface input/output devices 18 are also connected to the bus 16. These user interface devices 18 typically comprise a display and keyboard, and often include a pointing device such as a mouse.

A mass storage input/output device 20 is also preferably connected to bus 16, and interfaces the system 10 with one or more mass storage devices. These devices typically include magnetic or optical disk drives. Some systems do not include such mass storage devices 20, instead relying upon remote mass storage devices connected to a network. An adapter for serial input/output devices 22 is preferably connected to system bus 16. In a preferred embodiment, such adapter 22 provides communications between the system 10 and multiple serial communications ports. Various other devices may be included in the system 10 as known in the art.

The system of FIG. 1 shows all of the input/output devices as being connected to the main system bus 16. Many high performance systems provide a high speed bus between the central processor 12 and main memory 14. In such systems, an input/output controller (not shown) is connected to the high speed bus, and in turn connects to the various input/output devices 18, 20, 22 through a separate input/output bus (not shown). In such systems, data transferred between main memory 14 and the various input/output devices is routed through, and controlled by, the input/output controller. The multiple-port serial adapter described below can function equally well in a system of either type. It is only necessary to provide to an appropriate interface between the adapter and the bus to allow it to be used in many different types of computer systems.

Figure 2:
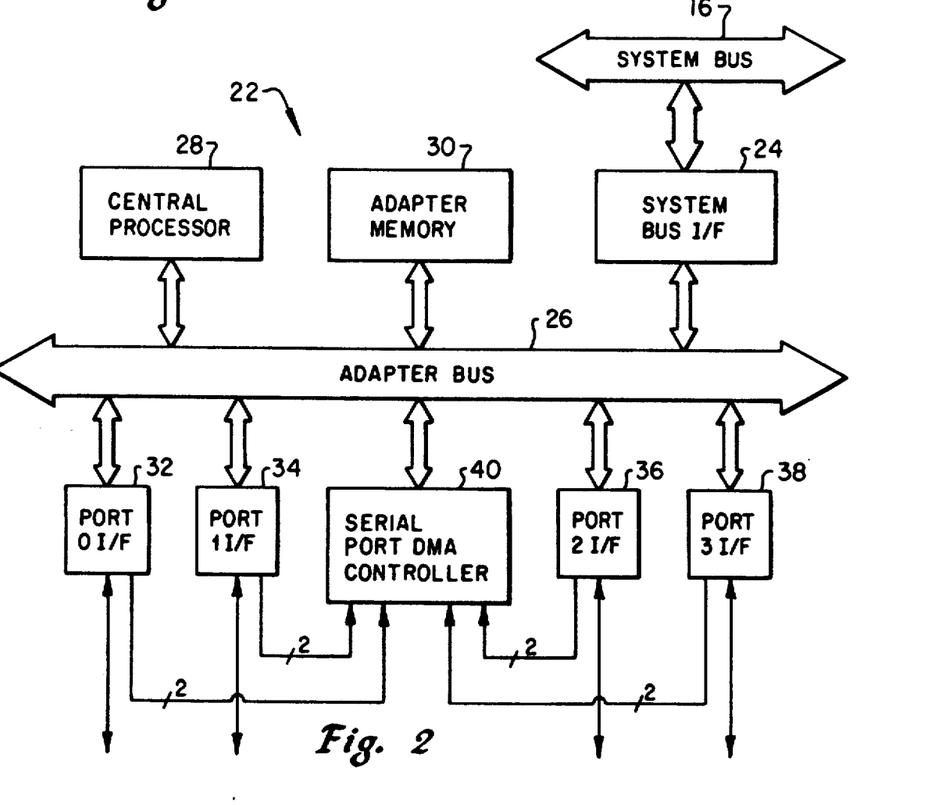
FIG. 2 is a block diagram of a preferred serial communications adapter for use with the system of FIG. 1.

Referring to FIG. 2, a preferred serial input/output adapter 22 is shown. Adapter 22 is connected to the system bus 16 through a system bus interface 24. Interface 24 is connected to an adapter bus 26, which is a high speed bus. Also connected to adapter bus 26 are a central processor 28 and an adapter memory 30. Central processor 28 can be a commercially available microprocessor, such as an INTEL 80186 processor. Adapter memory 30 is a computer system memory as known in the art, and is made available in an amount sufficient to support the functions described below. In typical applications, 512K bytes of adapter memory 30 are sufficient for four communications ports. Central processor 28 executes the functions of the adapter 22 using programs stored in the memory 30.

Also connected to adapter bus 26 are four serial port interfaces 32, 34, 36, and 38. Although four ports are shown in FIG. 2, more can be included on a single adapter if desired. The number of ports which can be included on a single adapter card 22 is limited only by the processing power which is available to serve the ports, and the number of physical port connections which can be made to the adapter card 22.

A serial port DMA controller 40 is connected to the adapter bus 26, and is used to control DMA transfers between the ports 32, 34, 36, 38 and the adapter memory 30. Each port has two signal lines connected directly to the DMA controller 40 to indicate when data is available in a receive buffer and when a transmit buffer is available to accept data. The DMA controller 40 uses such signals to determine when to initiate a DMA transfer between a communications port and adapter memory 30.

The DMA controller 40 and the system bus interface 24 are both capable of acting as bus masters of the adapter bus 26 in order to perform DMA transfers. Bus system interface 24 and DMA controller 40 use DMA to transfer data to and from adapter memory 30. In addition, interface 24 can also become a bus master for system bus 16, and transfer data to and from main memory 14 using a DMA channel. In the embodiment described herein, a single DMA channel is used by system bus interface 24 to transfer data for all of the communications ports 32, 34, 36, and 38.

In order to control operation of the adapter 22, central processor 28 executes a number of different routines which will be described below. Of notable importance is a task scheduler routine which determines which task is to be executed next. Various routines for setting up DMA transfer to and from the system bus 16 through the system bus interface 24, setting up transmit and receive operations between the adapter memory 30 and the communications ports, and for handling various error conditions, are executed by the central processor 28.

Figure 3:
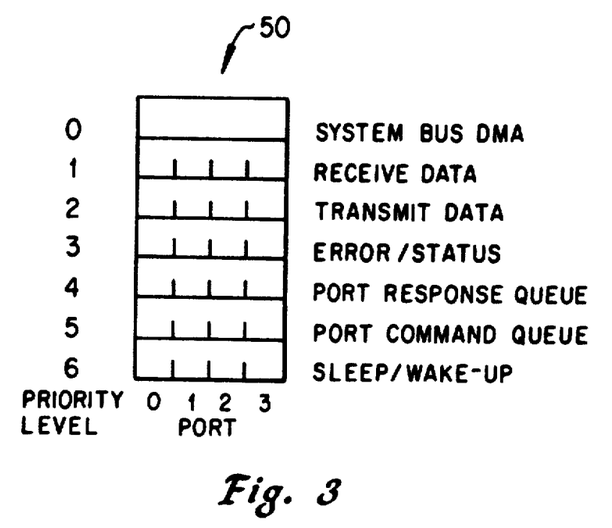
FIG. 3 illustrates a preferred scheduler work table according to the present invention.

FIG. 3 shows a schedule work table 50 preferably used for scheduling tasks on the adapter. Different tasks operate at different priority levels, with priority levels 0–6 being shown in FIG. 3. The number of priority levels actually used can be varied as needed to suit any particular implementation. Priority level 0 is the highest priority, with priority level 6 being the lowest priority.

Each priority level has an entry which is indicative of those tasks waiting to be performed. Priority levels 1–6 each consist of a bitmap having one entry corresponding to each communications port on the adapter. If any particular bit has a value of one, the corresponding port has the corresponding task scheduled.

The bits in the scheduler work table 50 are set by various interrupt handlers and by executing tasks as described in more detail below. When a hardware interrupt occurs, the appropriate handler determines which routine should be invoked to process it, and schedules such routine by setting a bit in the scheduler work table 50. When a routine executes, it can schedule other routines by setting bits in the table 50, and will generally unschedule itself by resetting its own bit.

The highest priority level, level 0, is used as a counter to indicate the number of currently scheduled tasks for that priority level. This difference in operation will be described in further detail below. In some implementations, it may be desirable to use other priority levels, or none at all, in this manner.

The highest priority level is the task which performs the system bus DMA transfers. Whenever a task needs to perform system bus DMA, it increments the level 0 counter and places necessary identifying information into a list in memory 30. Since only a single system bus DMA channel is available, only one system DMA task can operate at any given time. Any remaining system DMA tasks must wait until the currently executing system bus DMA task completes before they can be executed. Other tasks can be executed on the adapter while a system bus DMA task is executed as will be described below.

The level 1 task is called when a frame has been received over a communications port, and various steps must be taken to check the validity of the received frame. The receive data task causes a received frame to be examined, and any errors flagged. The receive data task also schedules a system bus DMA transfer of the received frame to the host.

The next priority task, level 2, is the transmit data task. This task initiates the transfer of data from the adapter memory 30 to the appropriate communications port. A transmit data task is scheduled when a frame of data for communications over a port has been assembled, or when a previous frame completes transmission.

The level 3 task is an error/status task which is invoked whenever an error appears on a communications port. The types of errors handled by this task preferably include line errors, such as unexpected changes in control signals, as well as data transmission errors.

Under circumstances which will be described below, various events which are generated by a port which is transmitting or receiving data must be queued to await later processing. Level 4 is a task which processes the entries in a port response queue. In a similar manner, level 5 is a task which processes commands which are sent to a port which have been queued to await later processing. Use of the port response queue and port command queue allows various types of processing to be performed without waiting for a communications port to finish its current operation. For example, commands can be sent to a port when it is convenient for the host system, and they will reside in the queue until they can be applied to the port. Incoming events are stored in the port response queue until they can be handled by the central processor 28 on the adapter 22.

The lowest priority level, level 6, is used to wake up tasks which have been put to sleep. Sometimes it is desirable to suspend operation of a task until a predefined event occurs. This task can be put to sleep as will be described below, and will remain suspended. When the predetermined event occurs, an interrupt handler associated with the event schedules the port response queue task, which in turn causes the appropriate bit to be set for level 6 of the scheduler work table 50. When the wakeup task is selected to be executed for that port, the suspended task resumes execution.

Figures 4A, 4B, 4C:
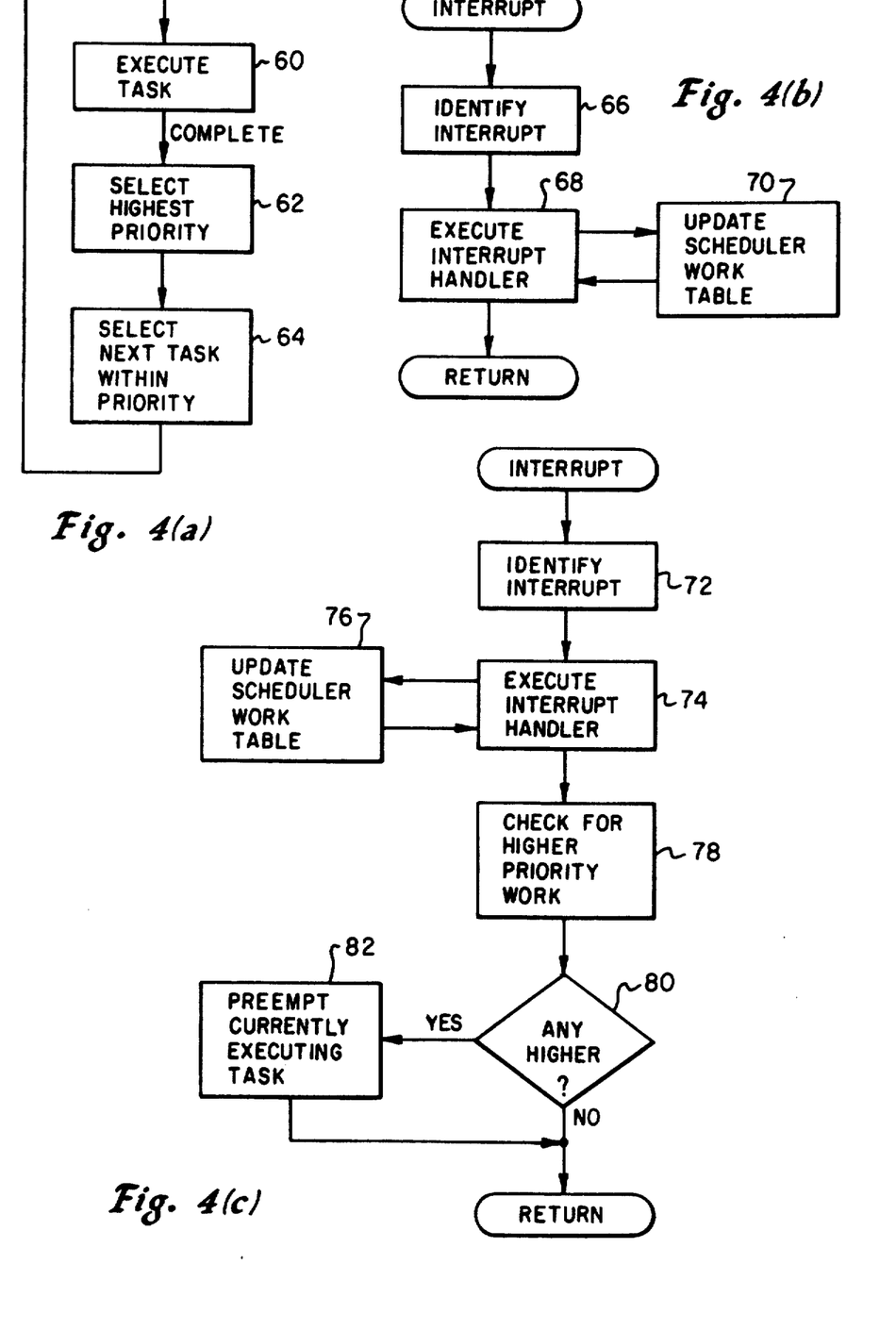

FIGS. 4(a), 4(b) and 4(c) illustrate the manner in which tasks are scheduled and executed. Referring to FIG. 4(a), the scheduler is seen to execute in an endless loop. A currently selected task, or process, is executed to completion 60. When execution of the task is complete, the scheduler selects the highest priority level which has any task scheduled 62. Within that priority level, the scheduler then selects a task to be executed. If more than one task is scheduled to be executed at the selected priority level, a round-robin strategy is used to determine which task is to be executed next. This insures that all ports will be equally treated, and that no port will have a task executed at any given priority level until all other ports having a task scheduled at the same priority level have been serviced. After the task has been selected, control returns to step 60 and the selected task is executed.

Steps 62 and 64 operate very quickly, and preferably are made uninterruptible. This is because the various interrupts which may occur often schedule tasks by updating the scheduler work table 50, and this activity would interfere with the selection process of steps 62 and 64. Process execution in step 60 is interruptible, and various hardware interrupts generated by the system and communications ports are used to schedule further tasks within the scheduler work table 50.

FIG. 4(b) shows the general method by which an interrupt is handled. When a hardware interrupt occurs on the adapter 22, control of the central processor 28 is vectored to a general interrupt routine. This routine identifies the nature of the interrupt which occurred 66, and causes the appropriate interrupt handler to be executed 68. The interrupt handler which executes in step 68 is preferably very short, and is made non-interruptible. It typically clears the cause of the interrupt, copies one or two data items to an appropriate area where they can be found by one of the regularly scheduled tasks, and in step 70 updates the scheduler work table to cause the appropriate task to be scheduled. Thus, while a task is executing in step 60, additional tasks are scheduled in work table 50 by the various interrupt handlers which are executed.

The method of FIG. 4(b) is used when the various tasks are made non-preemptable. In other words, an executing task is completed before another task is initialized by the scheduler. Since most tasks are fairly short, this does not present a problem in most systems. However, if desired, the various tasks can be made preemptable. If this is done, scheduling of a higher priority task by an interrupt causes the execution of the current task to be suspended and the higher priority task to be executed immediately. A higher priority task to be executed immediately. A flowchart of interrupt handling in such a situation shown in FIG. 4(c).

When a hardware interrupt occurs, the nature of the interrupt is identified 72 and an appropriate interrupt handler executed 74. As before, executing the interrupt handler causes the scheduler work table 50 to be updated 76. A check is then made 78 to see whether work having a higher priority than the currently executing task has been scheduled. If a higher priority task has not been scheduled 80, execution of the current task resumes. If a higher priority task was scheduled during execution of the interrupt handler 74, the currently executing process is preempted 82 and the scheduler invoked again to initiate execution of the higher priority process.

Figure 5:
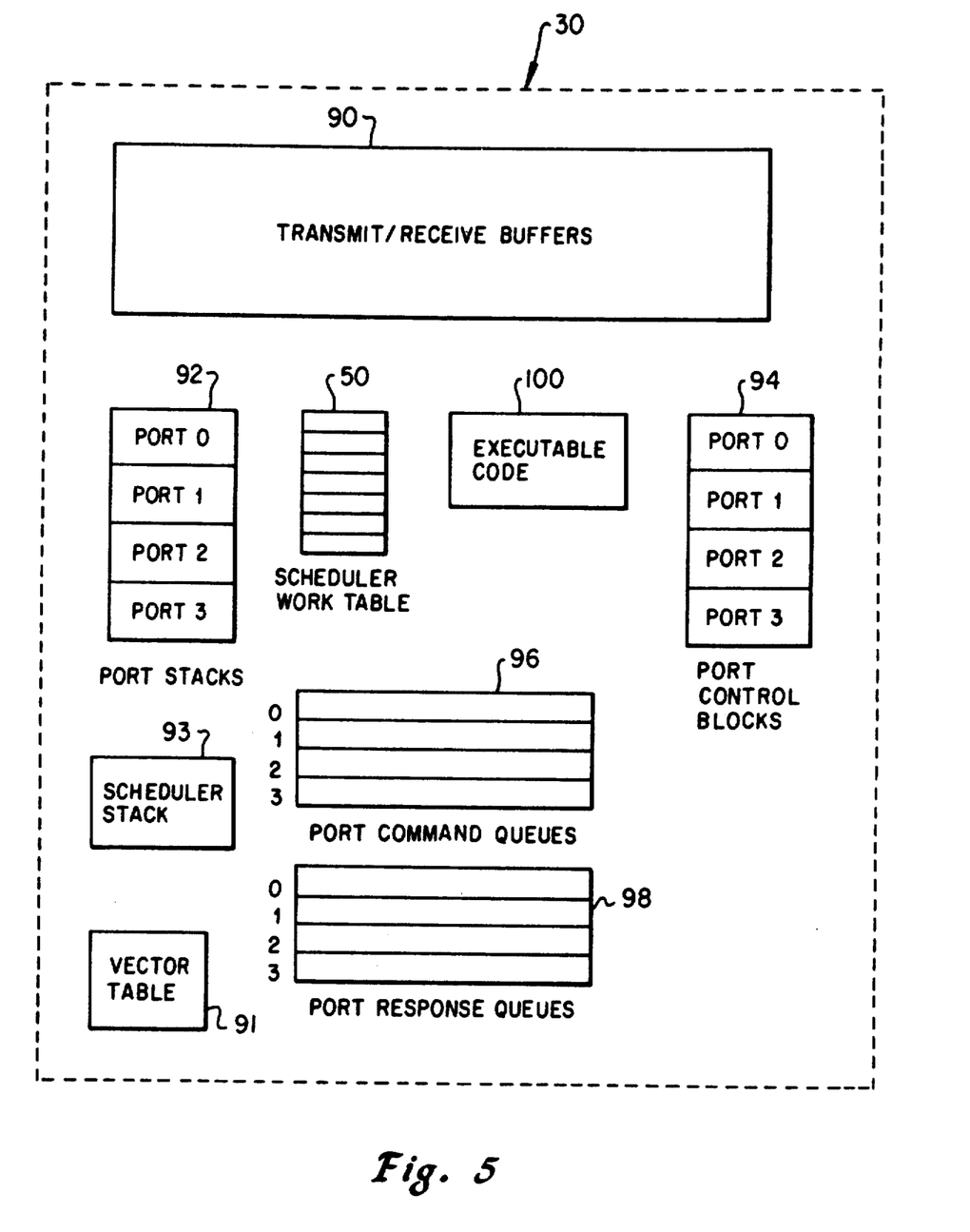
FIG. 5 illustrates contents of a memory included on a preferred adapter.

Referring to FIG. 5, some of the important data structures stored within the adapter memory 30 are shown. The major portion of memory 30 is preferably taken up by transmit/receive buffers 90. These buffers 90 are dynamically allocated from free space available within the memory 30. A list of free space available for the transmit/receive buffers 90 is maintained as known in the art.

A vector table 91 is allocated for use by the various tasks and interrupts. Stacks 92 are allocated for temporary data storage for each port independently. Thus, four stacks are allocated within memory 30 when four communications ports are provided on the adapter. A separate stack 93 is used by the scheduler. Each port also has a port control block 94 which contains pointers to various data structures which are accessed by the corresponding port. Port command queue 96 provides a FIFO queue for each port which contains commands sent to the port. Each command sent to a port is placed into a standard sized data structure referred to as a port command element, and the commands for each queue are placed into a circular buffer.

When a port command is executed which requires data to be transmitted to or from the host, further commands may not be executed for such port until the data transfer process is completed. In some systems, it is possible to use ping-pong buffers to transfer data through a port. In such cases, if one channel of a port is active, the other channel may be set up for the next transfer. Port commands waiting in the port command queue 96 may be executed in order to prepare the other buffer.

Each port also has a corresponding port response queue 98, which is comprised of a circular buffer in the same matter as the port command queue 96. The port response queues 98 contain entries generated by the corresponding ports which must be processed by the system. If a system bus DMA transfer is being performed for a port, all such responses being generated by the port must be routed to the port response queue 98. Also, if a port is sleeping, to be awakened by the occurrence of a predetermined event, all responses generated by the port are routed into the appropriate response queue 98.

Also found within the adapter memory 30 is the executable code 100 for the scheduler, the various scheduled tasks, and the interrupt handlers. Various other locations, used for temporary variable storage as known in the art, are located in adapter memory 30, but are not specifically shown in FIG. 5. Scheduler work table 50 is also contained in memory 30.

Figures 6, 7:
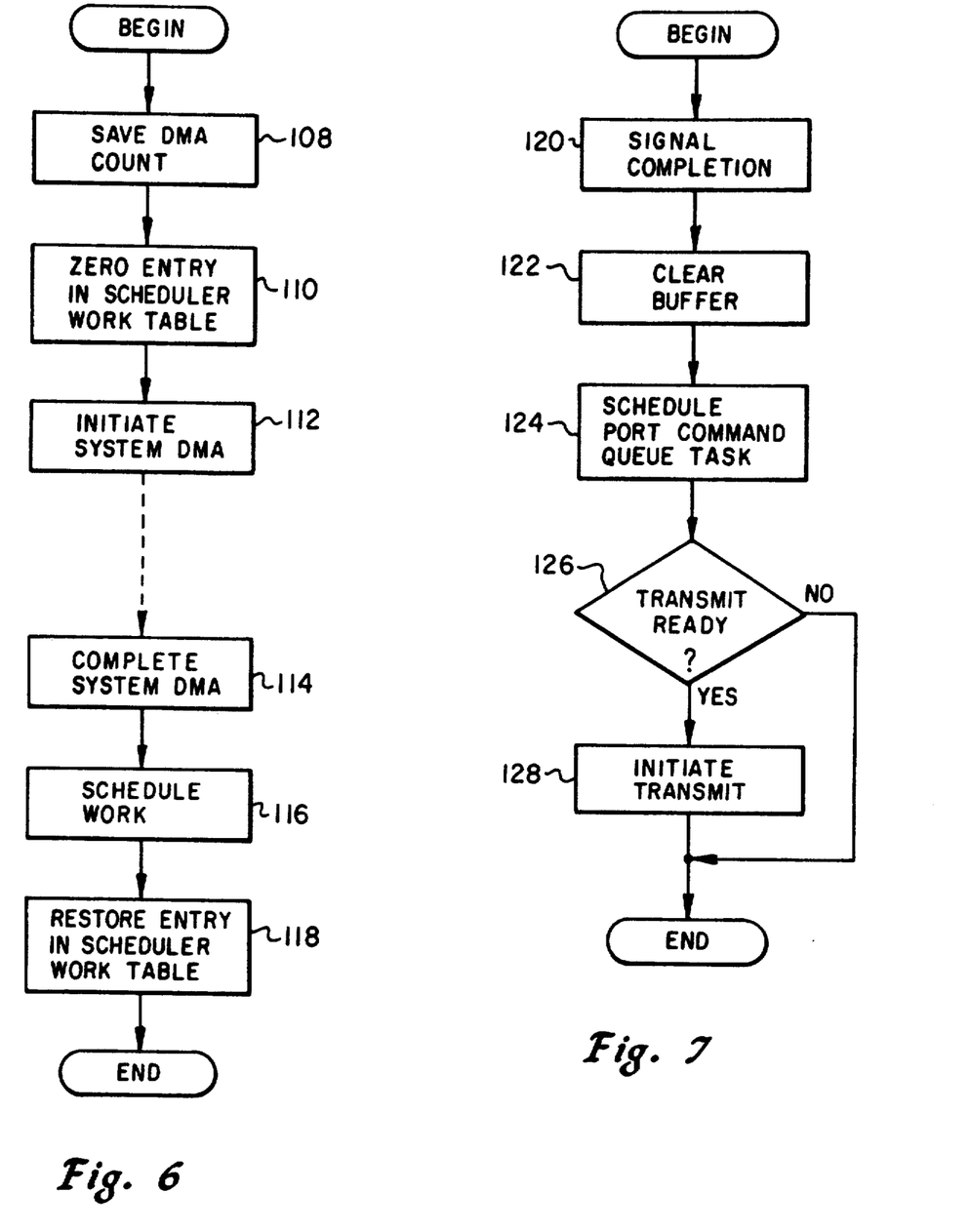
FIGS. 6 through 12 are flow charts illustrating operation of selected functions which can be scheduled according to the present invention.

Referring to FIG. 6, operation of the system bus DMA task is shown. As described above, the system bus DMA task uses the scheduler work table 50 differently than the other levels, in that the scheduler work table entry indicates the number of tasks which are scheduled rather than identifying the ports which have a task scheduled. When a system bus DMA task is scheduled, an indication of the requested task is stored in a separate data structure (not shown), and one of the scheduled system bus DMA tasks is selected according to any desired prioritizing scheme.

Once a system bus DMA task has been is initiated, other adapter processing may be performed while the transfer is taking place. Since the scheduler will attempt to schedule a level 0 task if possible, it is necessary to set the level 0 entry to 0 for the duration of the system bus DMA transfer. Thus, referring to FIG. 6, the first step performed by a selected system bus DMA task is to save the current DMA count 108 as reflected in level 0 of the scheduler work table 50. A 0 entry is then made for level 0 of the scheduler work table 110, and the system bus DMA task is initiated 112. Once DMA is initiated 112, control can be returned to the scheduler to select another task for execution.

At some future time, the system bus DMA transfer will be completed 114. At this time, an additional task must be scheduled 116, and the scheduler work table level 0 entry is restored 118. The value placed back into level 0 of the table 50 is preferably decremented before it is restored.

If a transmit DMA has occurred, which moves data from the host system onto the adapter 22, it is necessary to remove any locks (described below) which have been placed on the port command queue. In addition, a port command queue task is scheduled. When a receive DMA, which transfers data from the adapter 22 to the host system, completes, a port response queue task is scheduled. In addition, a global flag which causes routing of response events for that port into the port response queue is cleared to allow port responses to be handled normally. All of these actions occur in step 116.

FIG. 7 illustrates operation of the transmit data task. This task is scheduled when an end of frame interrupt indicates completion of a transmit operation through a port. The task first signals completion 120 by placing the relevant information into the port control block 94. The transmit buffer is then cleared and freed 122. The port command queue task is scheduled 124 by setting the appropriate bit in the scheduler work table 50. If another frame is ready for transmission 126, the transmission is initiated 128 and the task completes. If no frame is ready for transmission 126, the task simply returns.

Figure 8:
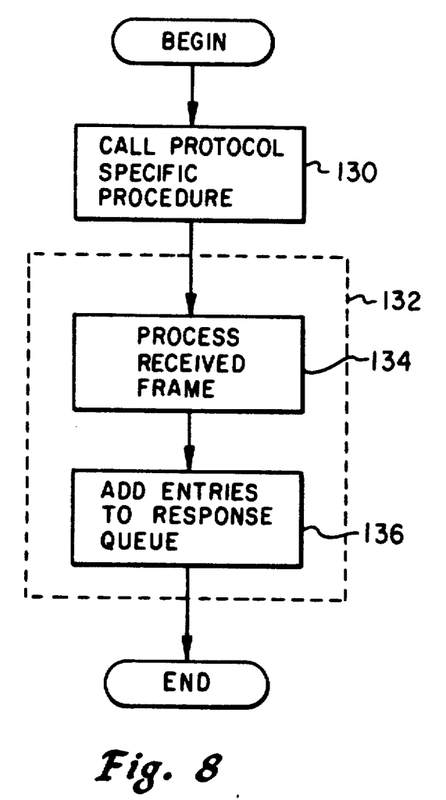

FIG. 8 shows the steps performed by the receive data task. First, a procedure which has been coded specifically to handle the communications protocol being used on the communications port is called 130. The protocol used on a communications port is indicated by appropriate values contained within the corresponding port control block 94. The steps shown in block 132 are actually performed by the protocol specific procedure. The received frame is processed 134 and any appropriate entries are added to the response queue 136. If errors occur within the received data frame, an error/status task can be scheduled.

Figure 9:
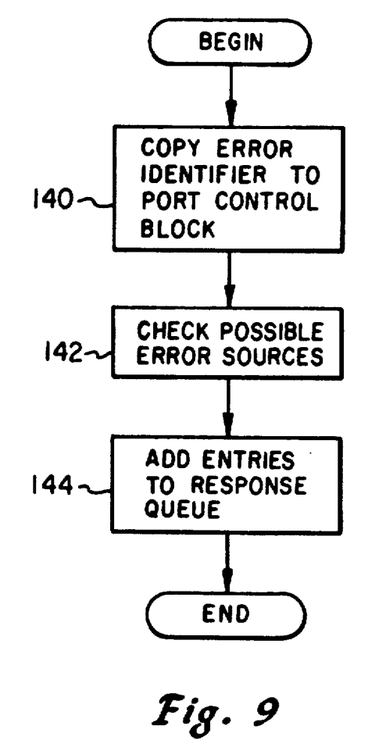

FIG. 9 shows the steps performed by the error/status task. An error identifier is copied by the interrupt handler to the port control block 140 for the port in order to indicate to later tasks which access that port that an error has occurred. The error identifier indicates the type of error which has occurred and the corresponding possible error sources are checked 142. Once the source of the error has been identified, appropriate entries are added to the response queue 144 for that port. When these entries are eventually processed, the port errors will be indicated to the system 10.

Figure 10:
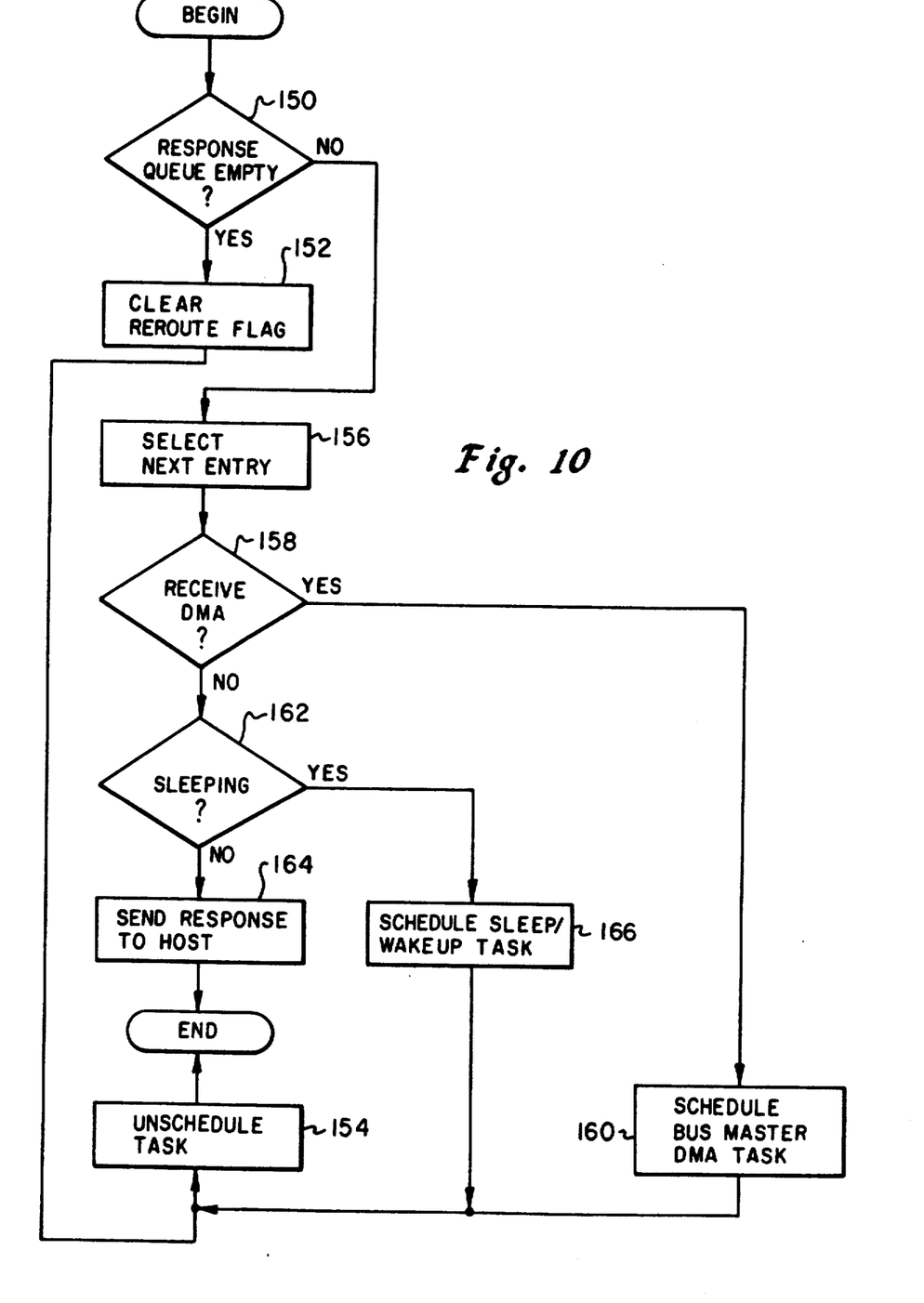

Operation of the port response queue task is illustrated in FIG. 10. A check is first made to see whether the queue is empty 150. If so, the flag which is used to automatically reroute port responses to the queue is cleared 152, causing port responses to be handled in the normal manner. The task then unschedules itself 154 from the scheduler work table 50 and completes. If there are entries in the queue 150, the next one is selected 156. A check is made 158 to see if the next entry is a response which requires a DMA transfer to be made to the host system 10. If so, the bus master DMA task is scheduled 160 and the current task is unscheduled 154. If the next entry is not a DMA transfer, a check is made to see whether a task is sleeping for the port 162. If not, the response is sent to the host 164. If a task is sleeping, the sleep/wakeup task is scheduled 166 and the current task is unscheduled 154.

Figure 11:
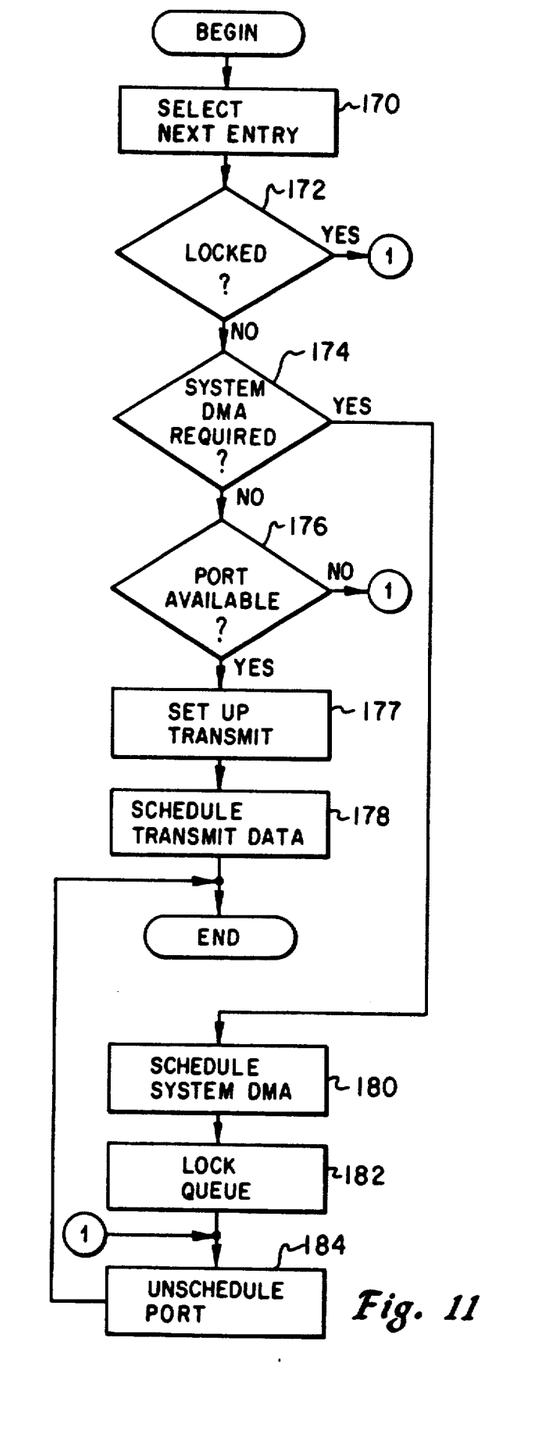

FIG. 11 illustrates the steps performed by the port command queue task. In general, this task selects the next entry in the port command queue 96 and causes it to be executed. The occurrence of various events may prevent execution of the next port command entry from occurring. The first step is to select the next entry 170 from the port command queue. If the next entry is not locked 172, a check is made to see whether a system bus DMA operation is required 174. If not, and the port is otherwise available 176, transmission of the next data block is set up 177 and the transfer data task is scheduled 178. As described above, up to two transmits can be preprocessed if two ping-pong buffers are provided for each port.

In many cases, it is necessary to perform a system bus DMA transfer to transfer data onto the adapter 22 before the data can be transmitted. If the test of step 174 results in a YES response, it is necessary to schedule an appropriate system DMA activity 180 and lock the currently selected entry of the port command queue 182. The level 5 task for this port is then unscheduled 184. As described above in connection with FIG. 6, completion of the system bus DMA task causes the lock set in step 182 to be removed, and the port command queue task for this port to be rescheduled. The next time through the process of FIG. 11, the system DMA test of step 174 will result in a NO response. If the next entry is locked in step 172, or the port is not available in step 176, control transfers to step 184 and the level 5 entry for this port in the scheduler work table 50 is unscheduled 184.

Figure 12:
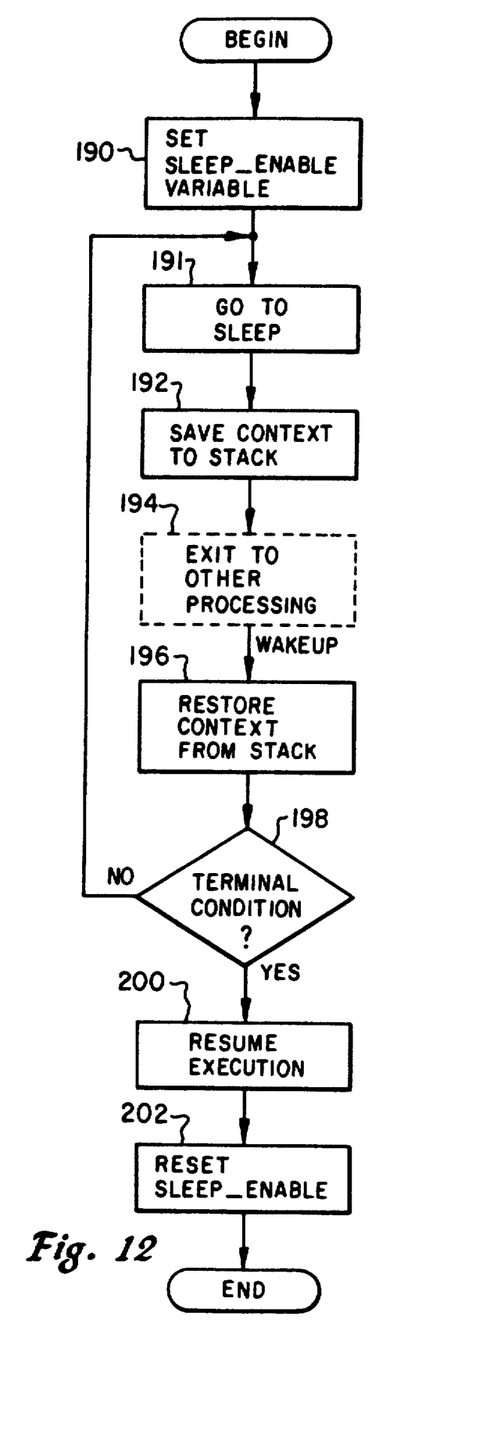

FIG. 12 illustrates the steps which are performed when a task puts itself to sleep and is subsequently awakened. A SLEEP_ENABLE variable is first set for the port 190. The task goes to sleep 191 and the current context is saved to the stack 192 for the port. Setting the SLEEP_ENABLE variable in step 190 causes any responses generated by the port to be routed to the port response queue 98. The task which is going to sleep is then exited and other processing occurs 194. While other processing occurs, the context which was saved in step 192 remains untouched on the port stack 92.

When new events are added to the port response queue, the port response queue task wakes up the sleeping task and the context is restored from the stack 196. A check is made 198 to determine whether the wakeup event was a terminal condition for which the task is waiting 198. If not, the task simply goes back to sleep 191. If the event actually causes the task to wake up, execution is resumed 200. When the task completes, the SLEEP_ENABLE variable is reset. The task can put itself back to sleep at a later stage in its execution, which causes the described sequence of events to repeat.

Since waking a sleeping task is the lowest level task which can be scheduled, the system is guaranteed to have the context which was saved to the stack in step 192 as the top frame on the stack when the wakeup is received. A wakeup is scheduled by another task or interrupt, which sets the appropriate bit on level 6 on the scheduler work table 50.

The system described above provides for priority scheduling of various communications subtasks on the adapter. The number of priority levels and the number of communications ports which can be supported are easily expanded without changing the underlying scheduler. The adapter of the preferred embodiment supports two separate levels of DMA transfer. One level is the DMA transfer preformed over the adapter bus 26, and the second level is the DMA transfer over the system bus 16 performed by the system bus interface 24.

Tasks have been prioritized by the preferred scheduler work table 50 so that the most time critical tasks have the highest priority. The transmit data and the receive data tasks, which must be performed in a timely manner to avoid data loss through the communications port, have a higher priority than handling of the various commands and responses placed in the queues 96 and 98. Tasks which put themselves to sleep, implying that time is not a critical factor, have the lowest priority of all. System bus DMA transfer tends to be the bottleneck because one resource is shared among all ports, so the system bus DMA task is given the highest priority. A mechanism is provided whereby other tasks are performed on the adapter 22 while a system bus DMA transfer is taking place. Since a round robin strategy is used for each priority level, no port becomes starved.

While the invention has been shown in only one of its forms, it is not thus limited but is susceptible to various changes and modifications without departing from the spirit thereof.

What is claimed is:

1. In a programmable communications controller connected between a host data processing system and a plurality of communications lines, a method for controlling data transfer between the communications lines, through a plurality of communications ports contained in the communications controller, and the host data processing system, the method comprising the steps executed by the programmable communications controller of:

providing in an intermediate memory a plurality of tasks for performing portions of a data transfer operation between the communications ports and the intermediate memory, and between the intermediate memory and the host data processing system;

generating a priority table in the intermediate memory having a highest priority level for requests for data block transfers between the intermediate memory and a communications port, wherein the highest priority level contains only a single entry location for the level, and a plurality of lower priority levels for the tasks, each lower priority level having an entry location for each communications port;

inserting entries into the lower priority entry locations identifying which of the tasks are to be performed in response to events which occur at the communications ports and within the host data processing system;

generating a counter for the entry location for the highest priority level for tracking the number of outstanding requests for data block transfers;

generating a queue, of outstanding requests for data block transfers, external to the priority table for the data block transfers;

responsive to execution of a data block transfer, resetting the counter of requests for data block transfers to zero for the duration of the data block transfer, whereby tasks at lower priority levels can be scheduled during the data block transfer; and selecting the tasks for execution from the priority table in order of priority level among the tasks identified by entries in the priority table.

2. The method of claim 1, further comprising executing a task for a plurality of communications ports in a round robin.

3. The method of claim 1, further comprising a step, responsive to hardware interrupts raised by the host system or by the communications ports, for inserting entries to the entry locations of the priority table or incrementing the counter for the highest priority level.

4. The method of claim 3, further comprising a step responsive to the execution of scheduled tasks for inserting entries to the priority table for other tasks.

5. A communications adaptor for transferring blocks of data over a plurality of communications sessions with a host data processing system, the communications adaptor comprising:

an interface to the host data processing system;

an intermediate memory;

a plurality of communications ports;

a processor for executing tasks for the communications ports;

a bus connecting said interface, said intermediate memory, said processor and said communications ports;

a direct memory access controller for transferring blocks of data between the communications ports and the intermediate memory over the bus;

means for generating a scheduling work table in the intermediate memory, the scheduling work table having a plurality of task priority levels, wherein a highest priority level has only a single entry, such single entry having a counter of outstanding requests for transfers of blocks of data, and a plurality of lower priority levels each having an entry location for each communications port for invoking the task for the communications port;

means for generating interrupts in response to events at said communications ports;

interrupt handler means for, in response to generated interrupts, inserting entries to the entry locations for lower priority levels, and incrementing the highest priority level counter for the highest priority level;

means for temporarily setting the counter of the highest priority level to zero during a transfer of a block of data; and means responsive to the scheduling work table for scheduling execution of the tasks for the communications ports in order of the priority levels.

6. The communications adaptor of claim 5, further comprising means responsive to executing tasks for inserting entries to the entry locations.

7. The communications adaptor of claim 5 and further comprising:

means for scheduling a plurality of invocations of a task for different communications ports in a round robin.

8. The communications adaptor of claim 5, and further comprising:

means responsive to user selected conditions for assigning a lowest priority level task to a communications port.

9. The communications adaptor of claim 5, and further comprising means for selecting the number of priority levels in the scheduling work table.

* * * * *